Feb. 15, 1966     H. G. OLSON     3,234,905
AQUARIUM COVER
Filed June 29, 1964
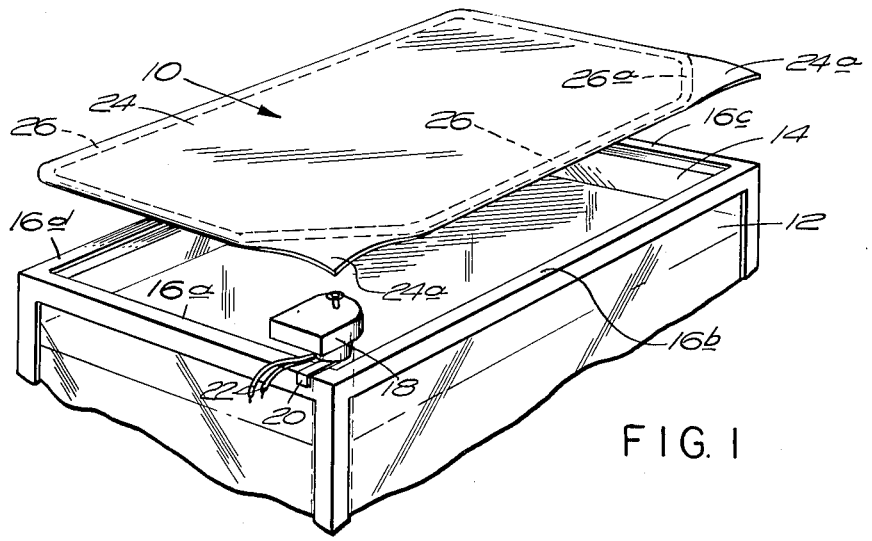
FIG. 1
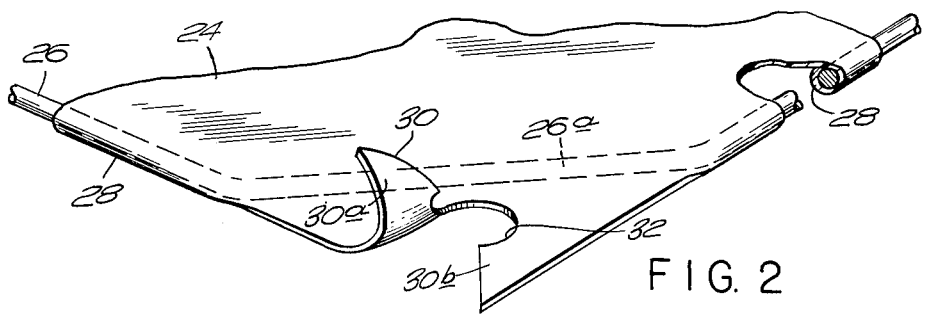
FIG. 2
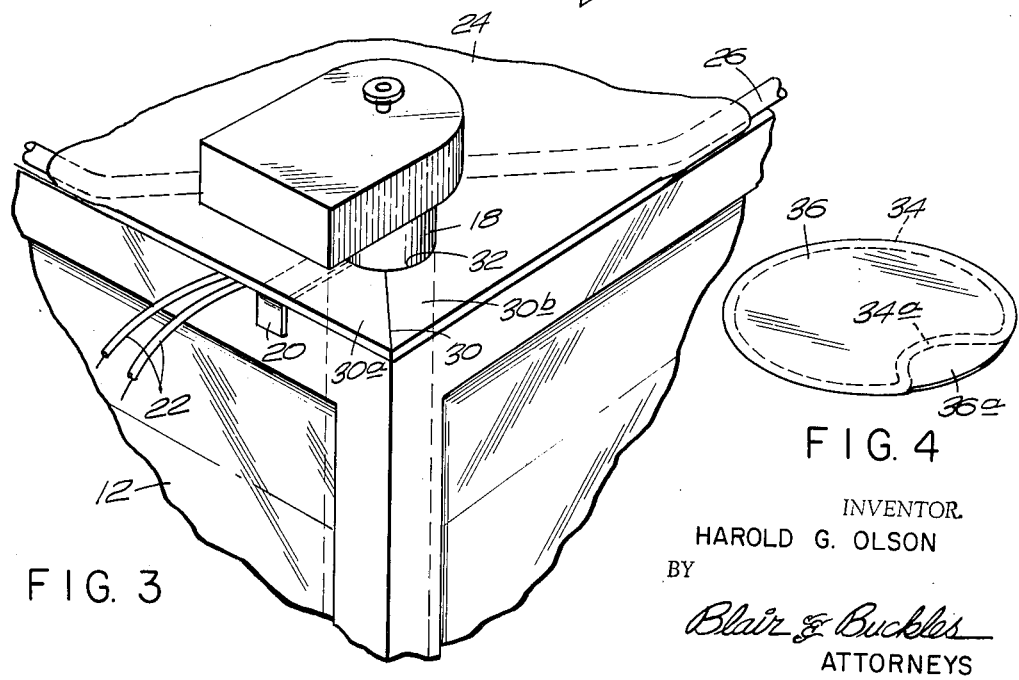
FIG. 3
FIG. 4
INVENTOR.
HAROLD G. OLSON
BY
*Blair & Buckles*
ATTORNEYS United States Patent Office 3,234,905
Patented Feb. 15, 1966

3,234,905
AQUARIUM COVER
Harold G. Olson, Burrits Landing, Westport, Conn.
Filed June 29, 1964, Ser. No. 378,757
3 Claims. (Cl. 119—5)

This invention relates to aquariums and more particularly to improved covers therefor.

It is normally necessary to provide some sort of a cover or hood for aquariums containing tropical fish to inhibit evaporation of the water in the tank and to exclude dust and other contaminating particles from the tank. The cover also prevents some particularly lively species of tropical fish from jumping out of the tank.

The fish aquariums on the market today are becoming more and more elaborate. They employ a variety of accessories and accoutrements to help maintain the proper environmental conditions in the tank. These accessories include heaters, thermometers, aerators, filters, lights, and the like, some or all of which project up through the top opening in the aquarium.

The aquarium covers available, however, have not provided adequately for these accessories. Some covers had pre-cut openings for accommodating the heater and hoses, etc. But these openings were not necessarily shaped to fit the particular accessory which the aquarium owner may have purchased. Thus, when the accessory was inserted into the opening provided therefor, gaps were still left at the top of the tank in which the fish frequently became lodged and through which evaporation occurred.

Some attempts have been made to overcome this problem by providing a full cover or hood to rest on or overlie the aquarium accessories. The full covers functioning in this manner, however, still left an opening at the top of the tank. Moreover, they had to extend a considerable distance up above the tank, and for this reason, tended to be large, bulky and rather unsightly.

Other full covers were made having openings in them to accommodate the accessories. But with those, the accessories had to extend over the frame of the cover. As a result, it was necessary first to remove the heater, filter hoses, and other accessories before the cover could be removed from the tank to clean it.

Accordingly, it is the principal object of this invention to provide an aquarium whose cover fits flush with the top of the aquarium and which completely encloses the aquarium opening.

It is a further object of this invention to provide an aquarium cover which completely covers the aquarium opening, but which can accommodate any aquarium accessory extending up through that opening.

It is a still further object of this invention to provide an aquarium cover which may be removed easily from the aquarium without disturbing the various accessories associated with the aquarium.

A more specific object of this invention is to provide an aquarium cover which comprises a relatively small, light package and which can be sent through the mails at small cost and with little danger of damage.

Another more specific object of this invention is to provide an aquarium cover which is readily manufactured out of inexpensive materials and which can be custom fitted by the aquarium owner to his particular aquarium setup and to accommodate his particular aquarium accessories.

Other objects of the invention will in part be obvious and will in part appear hereinafter.

The invention accordingly comprises an article possessing the features, properties, and the relation of elements which will be exemplified in the article hereinafter described, and the scope of the invention will be indicated in the claims.

For a fuller understanding of the nature and objects of the invention, reference should be had to the following detailed description taken in connection with the accompanying drawings, in which:

FIG. 1 is a fragmentary perspective view of an aquarium cover embodying the principles of my invention;

FIG. 2 is an enlarged, fragmentary perspective view, with parts cut away, of the aquarium cover of FIG. 1, cut to accommodate a heater;

FIG. 3 is a fragmentary perspective view on a still larger scale showing the aquarium cover of FIGS. 1 and 2 installed on an aquarium, and FIG. 4 is a perspective view on a small scale of a modified form of my invention.

In general, my improved aquarium cover comprises a piece of flexible sheet material cut to fit the top opening in the aquarium. The sheet material is mounted on a rigid frame which is shaped to rest on the top edge of the aquarium. The frame conforms for the most part to the perimeter of the aquarium opening, but has one or more portions which digress inwardly to underlie the material, leaving one or more flaps of material between the frame and the aquarium wall. The flaps are slitted from one edge and openings are formed therein for snugly receiving the particular aquarium accessories adjustably mounted on the wall of the tank. When the cover is properly placed over the top of the aquarium, the accessories extend up through the cover, which otherwise completely encloses the tank opening. The cover may easily be removed from the tank without disturbing those accessories simply by pulling it away from the tank. In this, the accessories slide out of their respective cover openings through the aforementioned flap slits.

Referring now more particularly to FIG. 1 of the drawing, my aquarium cover, indicated generally at 10, is shown as it would be received through the mails or purchased by the quarium owner and prior to its installation on a typical rectangular aquarium 12. Aquarium 12 has the usual top access opening 14 bounded by side edges 16a–d.

A heater 18 representative of the many accessories commonly associated with aquariums extends down through opening 14 into aquarium 12. Heater 18 is secured to the edge 16a by means of a bracket 20. The usual electrical leads 22 extend from the heater to the household electrical supply (not shown).

Still referring to FIG. 1, the aquarium cover 10 comprises a sheet 24 of relatively flexible, but not limp, material such as fibreglass, vinyl or nylon. The sheet 24 has the same shape as, but is slightly larger than, tank opening 14. Desirably also, it is translucent to permit diffused light to enter through the top of the tank.

Still referring to FIG. 1 and also to FIG. 2, the sheet 24 is mounted on a rigid frame 26 constructed of wire or wood or other such relatively stiff material. The frame 26 conforms for the most part to the perimeter of opening 14 in aquarium 12. Thus in the case of the cover 10 specifically illustrated in FIG. 1, the frame 26 is substantially rectangular in shape and is arranged and adapted to overlie the edges 16a–d.

Under this invention, however, the frame 26 includes one or more minor portions 26a which digress from the shape of the tank perimeter 16a–d and extend inwardly toward the center of frame 26 so that when the frame is properly positioned on aquarium 12 the portions 26a bridge or overlie the opening 14 at the corners thereof. It may be mentioned at this point that the inwardly diverted portions 26a are shown herein at the rear corners of frame 26 since the accoutrements are commonly mounted at the rear corners of the aquarium. But they may just as well be located along the sides of the frame.

Still referring to FIG. 2, the portions 28 of strip 24 adjacent to and overlying frame 26 are cemented, stitched or otherwise secured to frame 26. When properly affixed to frame 26, the major portion of strip 24 is held taut between the sides of the frame by the natural resiliency thereof. However, relatively small, loose flaps 24a of material remain outside of frame 26 at the minor frame portions 26a.

In accordance with this invention, my aquarium cover 10 can be custom fitted to accommodate any particular aquarium accessory. To do this, and referring to FIGS. 2 and 3, a given flap 24a is slitted at 30 inwardly from one edge by shears, knife or other suitable means thereby forming separate flap portions 30a and 30b. Next, a central passage 32 is cut in flap 24a contiguous with slit 30 and positioned and shaped to snugly receive the particular accessory, in this case, heater 18 mounted at the corner of aquarium 12. Then, the flap portion 30a (or 30b) is folded back as in FIG. 2, and the aquarium cover 10 is slid onto the top of aquarium 12 so that heater 8 is received in passage 32 and frame 26 rests on edges 16a–d. When the turned-up flap portion 30a is subsequently released, it lies down flat against the top of the aquarium and mates with its companion flap portion 30b thereby completely enclosing the part of tank opening 14 around heater 18. The heater bracket 20 and small wires 22 are free to pass under the flap 24a. However, in certain cases, as when the wires 22 are quite large, it may be desirable to provide an additional small slitted opening in flap portion 30a to accommodate those wires.

When the cover 10 is seated properly on edges 16a–d, it lies flat across the top of the aquarium and completely covers the top opening 14. There are no gaps or spaces around the tank edges or between the cover and accoutrements through which evaporation can occur or into which tropical fish may jump. In addition, the engagement of flaps 24a around the particular tank accessories helps to secure the cover 10 in position on the aquarium 12 so that it cannot be dislodged accidentally.

It is important to note, however, that when the time comes to feed the fish or clean the tank, the cover 10 may be removed quickly and easily without disturbing the heater 18 or any other accoutrements simply by grasping the cover and pulling it up away from the aquarium. The flap portions 30a and 30b part permitting heater 18 and the other devices to slide out of their respective passages 32 through slits 30.

When the light fixture is used with this aquarium, it may be seated as usual on the top of the aquarium at the front thereof, but over the aquarium cover 10. Since the sheet material 34 is translucent, the light will diffuse into the tank providing soft, natural lighting conditions. Alternatively, the cover 10 may be shaped so that it covers only the rear portion of the tank opening 14 (i.e., that part not covered by such a light fixture). In this way, the cover can be removed without even disturbing the light.

FIG. 4 shows a modified form of my aquarium cover suitable for use on a tank having a round top opening. This modified cover has a generally rounded frame member 34 conforming substantially to the perimeter of the aquarium opening. It includes also, however, a minor portion 34a which digresses inwardly toward the center of the frame. A round sheet 36 of flexible fibreglass or plastic is secured to the frame 34 as described above in connection with the apparatus of FIGS. 1–3. Sheet 36 has the same shape as, and is slightly larger than, the aquarium opening. There is thus formed a flap 36a lying outside frame 34 at the minor frame portion 34a. This flap 36a may be slitted from one edge and cut exactly as described above to provide a passage for any particular tank accoutrement suspended from the side of the aquarium. When installed, the round cover completely encloses the opening in the aquarium.

It will be seen from the foregoing, then, that my improved aquarium cover construction provides a simple and efficient means to cover the opening of an aquarium of any shape or size. My aquarium cover is quite rugged, so that it can be received through the mails by the aquarium owner and custom fitted to his particular aquarium setup. When the cover is properly seated on the aquarium, it does not project up from the tank, but completely covers the aquarium opening, preventing evaporation of the water therefrom and injury to the fish. Yet, the invention cover can be quickly and easily removed when it is desired to obtain access to the aquarium without disturbing the aquarium accessories.

It will be seen also that the objects set forth above, among those made apparent from the preceding description, are efficiently attained, and, since certain changes may be made in the above article without departing from the scope of the invention, it is intended that all matter contained in the above description or shown in the accompanying drawing shall be interpreted as illustrative and not in a limiting sense.

It is also to be understood that the following claims are intended to cover all of the generic and specific features of the invention herein described, and all statements of the scope of the invention which, as a matter of language, might be said to fall therebetween.

Having described the invention, what is claimed as new and secured by Letters Patent is:

1. A cover for an aquarium having upstanding sides and a top access opening comprising a flexible sheet whose shape conforms to said opening and a rigid stiffening member arranged and adapted to seat on the edges of said opening, said stiffening member having major portions thereof extending around and secured to marginal portions of said sheet, said stiffening member also having at least one minor portion extending inwardly from an edge of said sheet forming outside the perimeter of said member a flap of flexible material, said flap being bounded by said minor member portion and edges of said aquarium opening when said cover is seated on said edges of said opening means defining a passage through said flap, said passage being adapted to receive an aquarium accessory, said flap being slitted from said passage to the outer edge of said flap whereby said cover can be removed from said aquarium without disturbing said accessory.

2. A cover for an aquarium with a top access opening and an accessory extending down through said opening comprising a rigid frame for seating on the edge of said opening, said frame having its major portions substantially conforming to the edge of said opening and having at least one minor portion digressing inwardly and so as to overlie said opening when said frame is seated on said edge, and a sheet of flexible substantially non-porous, translucent material whose shape conforms to said opening, said sheet being secured to said frame around the perimeter thereof, thereby leaving a loose flap of flexible material outside of said minor frame portion, said flap being adapted to be cut to snugly receive therethrough said tank accessory.

3. An aquarium comprising a tank having upstanding sides and a top opening and including an accessory extending down into said opening, a relatively rigid frame removably fitted on said tank, the major portion of said frame substantially conforming to the edge of said opening, said frame having at least one portion thereof digressing inwardly away from the tank edge and bridging said opening, and a sheet of flexible material arranged on said frame so as to close over said tank opening, said sheet being secured to adjacent portions of said frame thereby leaving a loose flap of flexible material outside of said bridging frame portion and adjacent to the edge of said opening means defining a passage through said flap for receiving said accessory, said flap being slitted from said passage to the outer edge of said flap allowing said cover to be removed from said tank without first removing said accessory.

References Cited by the Examiner
UNITED STATES PATENTS 3,018,758   1/1962   Arnould _____ 119—5

FOREIGN PATENTS 841,073   7/1960   Great Britain.

SAMUEL KOREN, *Primary Examiner.*

HUGH R. CHAMBLEE, *Examiner.*